(12) United States Patent
Gumpoltsberger

(10) Patent No.: US 7,549,943 B2
(45) Date of Patent: Jun. 23, 2009

(54) MULTI-SPEED TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 386 days.

(21) Appl. No.: 11/704,879

(22) Filed: Feb. 9, 2007

(65) Prior Publication Data

US 2008/0103014 A1    May 1, 2008

(30) Foreign Application Priority Data

Feb. 14, 2006    (DE) .................. 10 2006 006 642

(51) Int. Cl.
*F16H 3/44* (2006.01)
*F16H 3/62* (2006.01)
*F16H 37/06* (2006.01)

(52) U.S. Cl. ...................... 475/284; 475/330
(58) Field of Classification Search ............ 475/296, 475/284, 275, 311, 323, 330
See application file for complete search history.

(56) References Cited

U.S. PATENT DOCUMENTS

| | | | |
|---|---|---|---|
| 4,395,925 A | 8/1983 | Gaus | |
| 5,106,352 A | 4/1992 | Lepelletier | |
| 5,250,011 A * | 10/1993 | Pierce | ............. 475/276 |
| 6,139,463 A | 10/2000 | Kasuya et al. | |
| 6,558,287 B2 | 5/2003 | Hayabuchi et al. | |
| 6,572,507 B1 | 6/2003 | Korkmaz et al. | |
| 6,634,980 B1 | 10/2003 | Ziemer | |
| 6,712,731 B1 * | 3/2004 | Raghavan et al. | ........... 475/275 |
| 6,743,146 B2 * | 6/2004 | Usoro et al. | ................ 475/296 |
| 6,780,138 B2 * | 8/2004 | Raghavan et al. | ........... 475/276 |
| 6,860,831 B2 | 3/2005 | Ziemer | |
| 6,932,735 B2 * | 8/2005 | Kao et al. | ................... 475/276 |
| 7,018,319 B2 | 3/2006 | Ziemer | |
| 7,052,432 B2 * | 5/2006 | Park | ........................ 475/284 |
| 7,507,179 B2 * | 3/2009 | Gumpoltsberger | .......... 475/285 |

FOREIGN PATENT DOCUMENTS

| | | |
|---|---|---|
| DE | 29 36 969 | 4/1981 |
| DE | 199 12 480 | 9/2000 |
| DE | 199 49 507 | 4/2001 |
| DE | 101 15 983 | 10/2002 |
| DE | 101 15 987 | 10/2002 |
| DE | 102 13 820 | 10/2002 |
| EP | 0 434 525 | 6/1991 |

* cited by examiner

*Primary Examiner*—Tisha D Lewis
(74) *Attorney, Agent, or Firm*—Davis & Bujold, P.L.L.C.

(57) ABSTRACT

A multi-speed transmission with reverse and forward gears has input and output shafts, planetary gearsets, six shafts and six shifting elements. The input shaft couples the sun gear of gearset (P2) and detachably couples, via clutches (13, 14), respective shafts (3, 4). Shaft (3) couples the carrier of gearset (P1), and detachably couples, via brake (03), the housing and, via clutch (36), shaft (6). Shaft (6) couples the ring gear of gearset (P2). Shaft (4) couples the sun gear of gearset (P1) and detachably couples, via brake (04), the housing. Shaft (5) couples the ring gear and the carrier of respective gearsets (P1, P3). The output shaft couples the carrier and the ring gear of respective gearsets (P2, P3). The sun gear of gearset (P3) is rotationally fixed to the housing. Either shaft (5) is connectable to shaft (6) or shaft (3), or shaft (3) is connectable to shaft (4).

23 Claims, 5 Drawing Sheets

| | 1 | 2 | 3 | 4 | 5 | 6 | 7 | R1 |
|---|---|---|---|---|---|---|---|---|
| i_G | 4.00 | 2.29 | 1.76 | 1.34 | 1.00 | 0.75 | 0.57 | -2.43 |
| phi | 7.00 | 1.75 | 1.30 | 1.31 | 1.34 | 1.34 | 1.31 | -0.61 |
| 03 | X | | | | | | | X |
| 04 | | X | | | | | X | |
| 13 | | | | | X | X | X | |
| 14 | | | | X | | X | | X |
| 36 | X | X | X | X | X | | | |
| 56 | | | X | | | | | |

| | 1 | 2 | 3 | 4 | 5 | 6 | 7 | R1 |
|---|---|---|---|---|---|---|---|---|
| i_G | 4.00 | 2.29 | 1.76 | 1.34 | 1.00 | 0.75 | 0.57 | -2.43 |
| phi | 7.00 | 1.75 | 1.30 | 1.31 | 1.34 | 1.34 | 1.31 | -0.61 |
| 03 | X | | | | | | | X |
| 04 | | X | | | | | X | |
| 13 | | | | | X | X | X | |
| 14 | | | | X | | X | | X |
| 36 | X | X | X | X | X | | | |
| 56 | | | X | | | | | |

|  | 1 | 2 | 3 | 4 | 5 | 6 | 7 | R1 |
|---|---|---|---|---|---|---|---|---|
| i_G | 4.00 | 2.29 | 1.76 | 1.34 | 1.00 | 0.75 | 0.57 | -2.43 |
| phi | 7.00 | 1.75 | 1.30 | 1.31 | 1.34 | 1.34 | 1.31 | -0.61 |
| 03 | X |  |  |  |  |  |  | X |
| 04 |  | X |  |  |  |  | X |  |
| 13 |  |  |  |  | X | X | X |  |
| 14 |  |  |  | X |  | X |  | X |
| 36 | X | X | X | X | X |  |  |  |
| 34 |  |  | X |  |  |  |  |  |

MULTI-SPEED TRANSMISSION

This application claims priority from German Application Serial No. 10 2006 006 642.1 filed Feb. 14, 2006.

FIELD OF THE INVENTION

The invention concerns a multi-speed transmission of planetary construction, in particular an automatic transmission for a motor vehicle.

BACKGROUND OF THE INVENTION

According to the prior art, automatic transmissions, in particular for motor vehicles, comprise planetary gearsets, which are shifted by way of frictional elements or shifting elements, such as possibly clutches and brakes, and are usually connected to a starting element that is subjected to a slip effect and is selectively provided with a lockup clutch, such as a hydrodynamic torque converter or a fluid clutch.

A transmission such as this is disclosed in EP 0 434 525 A1. It comprises essentially an input shaft and an output shaft, which are arranged parallel to each other, a double planetary gearset arranged concentrically with the output shaft, and five shifting elements in the form of three clutches and two brakes, whose selective engagement in pairs determines the various gear ratios between the input shaft and the output shaft. The transmission comprises a front-mounted gearset and two power paths, so that six forward gears can be achieved by selectively engaging, in pairs, the five shifting elements.

Two clutches are required, in the first power path, for the transmission of torque from the front-mounted gearset to two elements of the double planetary gearset. In the direction of power flow, these are arranged essentially behind the front-mounted gearset in the direction of the double planetary gearset. With the second power path another clutch is provided, which detachably connects this to another element of the double planetary gearset. The clutches are arranged in such a way herein that the inner disk carrier forms the output.

A compact multi-speed transmission of planetary construction, in particular for a motor vehicle, which comprises two planetary gearsets and one front-mounted gearset, as well as three clutches and two brakes, is also known from U.S. Pat. No. 6,139,463. In this known multi-speed transmission, two clutches C-1 and C-3 are provided in a first power path for transmitting torque from the front-mounted gearset to the two planetary gearsets. Here, the outer disk carrier and/or the cylinder or piston and pressure compensating side of the clutch C-3 is connected to a first brake B-1. In addition, the inner disk carrier of the third clutch C-3 is connected to the cylinder or piston and pressure compensating side of the first clutch C-1, wherein the inner disk carrier of the first clutch C-1 is arranged on the output side and is connected to a sun gear of the third planetary gearset.

From DE 199 49 507 A1 of the applicant a multi-speed transmission is additionally known, in which two non-shiftable front-mounted gearsets are provided on the input shaft, which generate two rotational speeds on the output side, which, in addition to the rotational speed of the input shaft, can be optionally shifted to a shiftable double planetary gearset that acts on the output shaft by selectively engaging the shifting elements that are used in such a way that, in order to shift from one gear to the next higher or lower gear, only one shifting element of the two just actuated shifting elements has to be engaged or disengaged.

From DE 199 12 480 A1 an automatically shiftable motor vehicle transmission is known, which comprises three single carrier planetary gearsets as well as three brakes and two clutches for shifting six forward gears and one reverse gear, and one input shaft and one output shaft. The automatically shiftable motor vehicle transmission is designed in such a way that the input shaft is connected directly to the sun gear of the second planetary gearset, and the input shaft can be connected to the sun gear of the first planetary gearset by way of the first clutch and/or to the carrier of the first planetary gearset by way of the second clutch. In addition or as an alternative, the sun gear of the first planetary gearset can be connected to the housing of the transmission by way of the first brake and/or the carrier of the first planetary gearset can be connected to the housing by way of the second brake and/or the sun gear of the third planetary gearset can be connected to the housing by way of the third brake.

Furthermore, from DE 102 13 820 A1 an automatic multi-speed transmission is known, which comprises a first input path T1 of a first gear ratio; an input path T2, which has a greater gear ratio than the input path T1; a planetary gearset with four elements, wherein the four elements are a first element, a second element, a third element, and a fourth element in the sequence of the elements in a speed diagram; a clutch C-2, which transmits a rotation of the input path T2 to the first element S3; a clutch C-1, which transmits the rotation from the input path T2 to the fourth element S2; a clutch C-4, which transmits a rotation from the input path T1 to the first element; a clutch C-3, which transmits the rotation from the input path T1 to the second element C3; a brake B-1, which induces the engagement of the fourth element; a brake B-2, which induces the engagement of the second element; and an output element, which is coupled to the third element R3.

Within the scope of DE 101 15 983 A1 of the applicant a multi-speed transmission is described, which comprises an input shaft that is connected to a front-mounted gearset, an output shaft that is connected to a rear-mounted gearset, and a maximum of seven shifting elements, whose selective shifting allows at least seven forward gears to be shifted without a range shift. The front-mounted set is comprised of a front-mounted planetary gearset or a maximum of two non-shiftable front-mounted planetary gearsets that are coupled to the first front-mounted planetary gearset, wherein the rear-mounted gearset is designed as a two-carrier, four-shaft transmission with two shiftable, rear-mounted planetary gearsets, and has four free shafts. The first free shaft of this two-carrier, four-shaft transmission is connected to the first shifting element; the second free shaft is connected to the second and third shifting elements; the third free shaft is connected to the fourth and fifth shifting elements; and the fourth free shaft is connected to the output shaft. For a multi-speed transmission with a total of six shifting elements, it is proposed according to the invention to additionally connect the third free shaft or the first free shaft of the rear-mounted gearset to a sixth shifting element. For a multi-speed transmission with a total of seven shifting elements, it is proposed according to the invention to additionally connect the third free shaft to a sixth shifting element D' and to additionally connect the first free shaft to a seventh shifting element.

A multi-speed transmission with at least seven gears is further described within the scope of DE 101 15 987 of the applicant. This transmission consists, in addition to the input shaft and the output shaft, of a non-shiftable front-mounted gearset and a shiftable rear-mounted gearset in the form of a two-carrier, four-shaft transmission. The front-mounted gearset consists of a first planetary gearset which, in addition to the input rotational speed of the input shaft, offers a second rotational speed, which can be optionally transferred to a rear-mounted gearset. The rear-mounted gearset consists of two shiftable, planetary gearsets, which can shift into at least seven gears using the six shifting elements, whereupon two power paths are formed. Range shifts are advantageously always prevented during each shifting operation. A 9-gear multi-speed transmission is furthermore known from DE 29 36 969; it comprises eight shifting elements and four gearsets.

Automatically shiftable motor vehicle transmissions of planetary construction have been described multiple times in the state of the art and are subject to continuous development and improvement. These transmissions should have a sufficient number of forward gears as well as one reverse gear and a gear ratio, well suited for motor vehicles, with a high overall transmission ratio spread as well as favorable progressive ratios. They should further enable a high starting gear ratio in the forward direction and should contain a direct gear, and should be suitable for use in both passenger vehicles and commercial vehicles. In addition, these transmissions should require a low construction costs, in particular, require a small number of shifting elements and should prevent double-shifting when shifting sequentially so that only one shifting element is engaged when shifting into defined gear groups.

It is the object of the invention to propose a multi-speed transmission of the kind described above, in which the construction cost is low and the efficiency of the main travel gears is also improved in terms of drag and gearing losses. A low torque should act on the shifting elements and planetary gearsets and the rotational speeds of the shafts shifting elements, and planetary gearsets should also be kept as low as possible with the multi-speed transmission of the invention. Furthermore, the number of gears as well as the spread of transmission ratios should be increased, so that seven forward gears and at least one reverse gear can be advantageously implemented. The transmission of the invention should also be suited for any vehicle design, especially for a front-transverse arrangement.

SUMMARY OF THE INVENTION

A multi-speed transmission of planetary design, according to the invention, is consequently proposed, which comprises an input shaft and an output shaft arranged in a housing. At least three planetary gearsets, which hereinafter will be called the first, second and third planetary gearsets, at least six rotatable shafts, hereinafter referred to as the input shaft, the output shaft, the third, fourth, fifth and sixth shafts, and at least six shifting elements, comprising brakes and clutches, are provided, whose selective engagement creates different gear ratios between the input shaft and the output shaft, so that preferably seven forward gears and one reverse gear can be realized.

The input shaft is herein permanently connected to the sun gear of the second planetary gearset, it can be connected to the third shaft by way of a clutch and to the fourth shaft by way of a further clutch, wherein the third shaft is permanently connected to the carrier of the first planetary gearset, can be coupled to the housing by way of a brake, and can be releasably connected by way of a clutch to the sixth shaft, which is permanently connected to the ring gear of the second planetary gearset. The fourth shaft is permanently connected to the sun gear of the first planetary gearset and can be coupled to the housing by way of a brake, wherein the fifth shaft is permanently connected to the ring gear of the first planetary gearset and to the carrier of the planetary gearset, and the output shaft is permanently connected to the carrier of the second planetary gearset and to the ring gear of the third planetary gearset.

According to the invention, the sun gear of the third planetary gearset is connected to the housing in a rotationally fixed, wherein either the fifth shaft can be releasably connected to the sixth shaft by way of a clutch, or the fifth shaft can be releasably connected to the third shaft by way of a clutch, or the third shaft can be releasably connected to the fourth shaft by way of a clutch.

The configuration of the multi-speed transmission according to the invention produces suitable gear ratios, particularly for passenger vehicles, as well as a significant increase in the overall transmission ratio spread of the multi-speed transmission, whereby an improvement in driving comfort and a significant decrease in fuel consumption are brought about.

Furthermore, the construction cost is considerably reduced with the multi-speed transmission according to the invention due to the low number of shifting elements, preferably two brakes and four clutches. It is advantageously possible with the multi-speed transmission according to the invention to initiate drive with a hydrodynamic converter, a hydrodynamic clutch, an external starting clutch, or other suitable external starting elements. It is also conceivable to initiate drive using a starting element that is integrated into the transmission. A shifting element that is actuated in the first forward gear and in the reverse gear is preferably suitable.

The multi-speed transmission according to the invention furthermore achieves a good efficiency in the main travel gears in terms of drag and gearing losses.

A low torque is furthermore present in the shifting elements and in the planetary gearsets of the multi-speed transmission, whereby the wear is advantageously reduced in the multi-speed transmission. The low torque enables a correspondingly smaller dimensions, whereby the required installation space and corresponding costs are reduced. Aside from this, the rotational speeds of the shafts, the shifting elements, and the planetary gearsets are low.

Moreover, the transmission according to the invention is designed in such a way that an adaptation to different drive train configurations, both in the power flow direction and also from a spatial point of view, is made possible.

BRIEF DESCRIPTION OF THE DRAWINGS

The invention will now be described, by way of example, with reference to the accompanying drawings in which.

DETAILED DESCRIPTION OF THE INVENTION

Figures 1, 2:
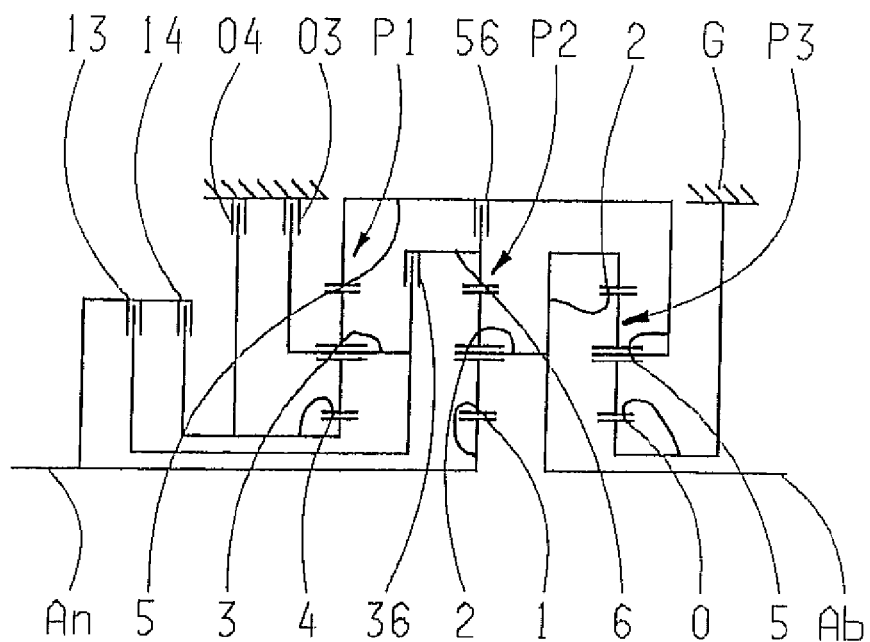
FIG. 1 is a schematic view of a preferred embodiment of a multi-speed transmission according to the invention.
FIG. 2 is an exemplary shifting diagram of a multi-speed transmission of FIG. 1 according to the invention.

In FIG. 1 a multi-speed transmission according to the invention is depicted, comprising an input shaft 1(An) and an output shaft 2 (Ab), which are arranged in a housing G. Three planetary gearsets P1, P2, P3 are provided, which are preferably designed as minus planetary gearsets and are arranged in the sequential order of P1, P2, P3 in an axial direction.

As is shown in FIG. 1, only six shifting elements, namely two brakes 03, 04 and four clutches 13, 14, 36 and 56, are provided. A selective shifting of preferably seven forward gears and one reverse gear can be implemented with these shifting elements. The multi-speed transmission according to the invention has a total of six rotatable shafts, namely the shafts 1, 2, 3, 4, 5 and 6.

In the multi-speed transmission of FIG. 1, it is provided according to the invention that the input is applied to the shaft 1, which is permanently connected to the sun gear of the second planetary gearset P2, can be releasably connected to the shaft 3 by way of a clutch 13 and to the shaft 4 by way of a clutch 14, wherein the shaft 3 is permanently connected to the carrier of the first planetary gearset P1, can be coupled to the housing G by way of a brake 03, and can be releasably connected by way of the clutch 36 to the shaft 6, which is permanently connected to the ring gear of the second planetary gearset P2, and wherein the shaft 4 is permanently connected to the sun gear of the first planetary gearset P1 and can be coupled to the housing G by way of the brake 04. According to the invention, the shaft 5 is permanently connected to the ring gear of the first planetary gearset P1 and to the carrier of the third planetary gearset P3, wherein the output shaft 2 is permanently connected to the carrier of the second planetary gearset P2 and to the ring gear of the third planetary gearset P3, and the sun gear of the third planetary gearset P3 is connected to the housing G (shaft 0) in a rotationally fixed manner. As can be seen in FIG. 1, the shaft 5 can be releasably connected to the shaft 6 by way of a clutch 56.

Within the scope of the embodiment shown, the clutches 13 and 14, viewed axially, are arranged side by side in the sequence 13, 14 and can have a joint outer disk carrier as disk clutches.

The spatial arrangement of the shifting elements can be freely selected and is limited only by the dimensions and the outer shape.

In FIG. 2, an exemplary shifting diagram of the multi-speed transmission of FIG. 1 according to the invention is depicted. Two shifting elements are engaged for each gear. The schematic diagram shows, as an example, the respective gear ratios i of the individual gear steps and the progression ratios phi to be determined therefrom. It can also be seen in the schematic diagram that double shifting or range shifts are prevented in the sequential shifting operation, since two adjoining gear steps jointly utilize one shifting element.

The first gear is achieved by engaging the brake 03 and the clutch 36, the second gear is achieved by engaging the brake 04 and the clutch 3, and the third gear 26 is achieved by engaging the clutches 36 and 56. In addition, the fourth gear is achieved by engaging the clutch 14 and the clutch 36, the fifth gear is achieved by engaging the clutches 13 and 36, the sixth gear is achieved by engaging the clutch 13 and the clutch 14, and the seventh gear is achieved by engaging the brake 04 and the clutch 13. As can be seen in the schematic diagram, the reverse gear is achieved by engaging the brake 03 and the clutch 14; the fifth gear can be configured as a direct gear.

A startup is possible according to the invention with an integrated shifting element (IAK), for which the brake 03 is particularly suitable, which is required in the first gear and in the reverse gear. Different gear steps can also be achieved with the same gear pattern, depending on the shifting logic, so that a variation specifically adapted to the application and/or vehicle is possible.

Figures 3, 4:
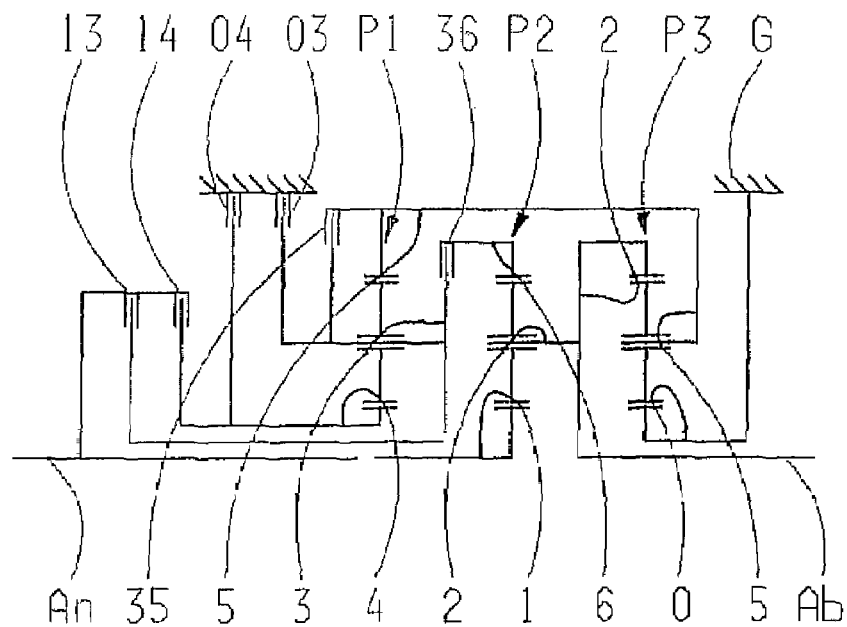
FIG. 3 is a schematic view of another preferred embodiment of a multi-speed transmission according to the invention.
FIG. 4 is an exemplary shifting diagram of a multi-speed transmission according to FIG. 3.

The exemplary embodiment shown in FIG. 3 differs from the embodiment according to FIG. 1 in that the shaft 5 can be releasably connected to the shaft 3 by way of a clutch 35, wherein the releasable connection between the shafts 5 and 6 is eliminated.

The shifting diagram is depicted in FIG. 4 and corresponds to the schematic diagram according to FIG. 2, with the difference being that the clutch 56 is replaced by the clutch 35.

Figures 5, 6:
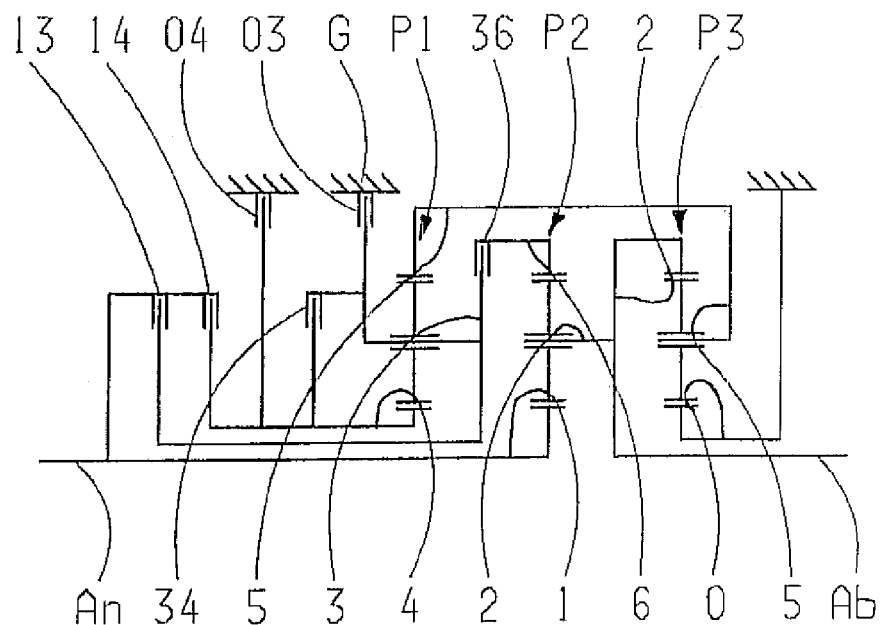
FIG. 5 is a schematic view of another preferred embodiment of a multi-speed transmission according to the invention.
FIG. 6 is an exemplary shifting diagram of the multi-speed transmission of FIG. 5 according to the invention.

The exemplary embodiment, shown in FIG. 5, differs from the embodiment according to FIG. 1 in that the shaft 3 can be releasably coupled to the shaft 4 by way of a clutch 34, wherein the releasable connection between the shafts 5 and 6 is eliminated.

The shifting diagram, depicted in FIG. 6 corresponds to the schematic diagram, according to FIG. 2, with the difference that the clutch 56 is replaced by the clutch 34.

Figure 12:
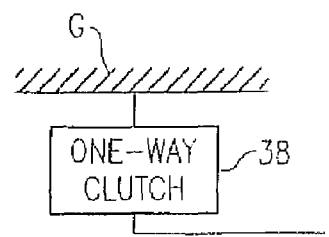
FIG. 12 is a diagrammatic view of an embodiment of the inventive multi-speed transmission having a one-way clutch.

It is possible, according to the invention, to provide, as shown in FIG. 12, additional one-way clutches 38 at each suitable point of the multi-speed transmission, for example between a shaft and the housing or to connect two shafts, if required.

Figure 7:
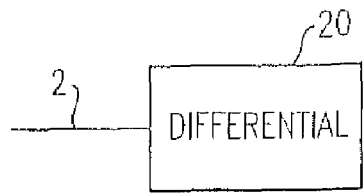
FIG. 7 is a diagrammatic view of an embodiment of the inventive multi-speed transmission having a differential.

An axle differential 20 and/or a distributor differential can be arranged on the input side or on the output side according to the invention and as shown in FIG. 7.

Figure 8:
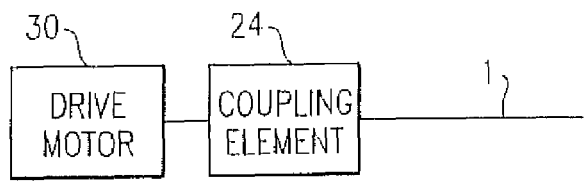
FIG. 8 is a diagrammatic view of an embodiment of the inventive multi-speed transmission with a coupling element and a drive motor.
Figure 9:
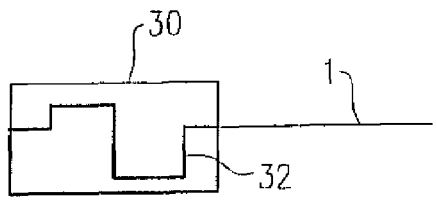
FIG. 9 is a diagrammatic view of an embodiment of the inventive multi-speed transmission with a crankshaft of the drive motor fixed to an input shaft of the multi-speed transmission.
Figure 16:
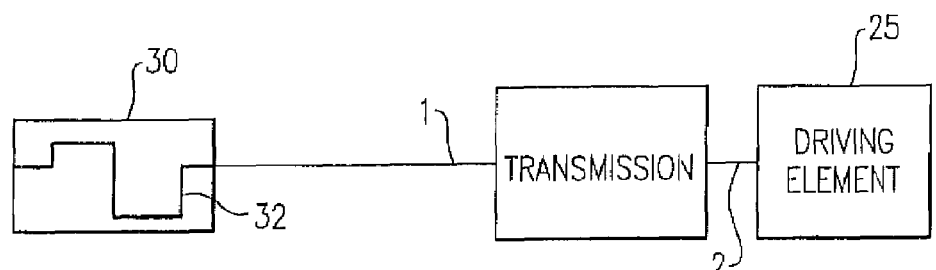
FIG. 16 is a diagrammatic view of another embodiment of the inventive multi-speed transmission with the crankshaft of the drive motor fixed to the input shaft of the multi-speed transmission and the coupling element located behind the multi-speed transmission.

Within the scope of an advantageous further development, as shown in FIG. 8, the input shaft 1 can be separated, if required, from a drive motor 30 by way of a coupling element 24, while a hydrodynamic converter, a hydraulic clutch, a dry starting clutch, a wet starting clutch, a magnetic powder clutch, or a centrifugal clutch can be used as the coupling element. It is also feasible, as shown in FIG. 16, to arrange such a driving element 25 behind the transmission in the power flow direction, in which case the input shaft 1 is permanently connected to the crankshaft 32 of the drive motor 30, as shown in FIG. 9.

Figure 10:
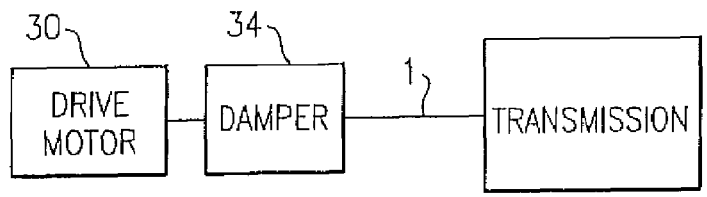
FIG. 10 is a diagrammatic view of an embodiment of the inventive multi-speed transmission having the drive motor communicating with a damper.

The multi-speed transmission, according to the invention and shown in FIG. 10, also enables the arrangement of a torsional vibration damper 34 between the drive motor 30 and transmission.

Figure 11:
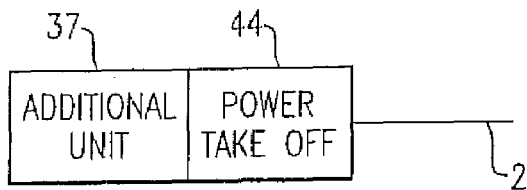
FIG. 11 is a diagrammatic view of an embodiment of the inventive multi-speed transmission with a power take-off for driving an additional unit.
Figure 15:
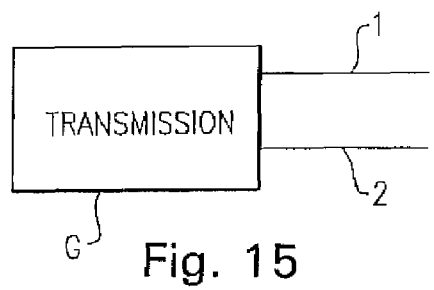
FIG. 15 is a diagrammatic view of a further embodiment of the invention with the input and the output being provided on the same side of the multi-speed transmission housing.

Within the scope a further embodiment, as shown in FIG. 4 of the invention, a wear-free brake 42, for example a hydraulic or electric retarder or the like, can be arranged on each shaft, preferably on the input shaft 1 or the output shaft 2, which is of particular importance for use in commercial vehicles. A power take-off 44 can be provided as shown in FIG. 11, in addition, in order to drive additional units 37 on each shaft, preferably on the input shaft 1 or the output shaft 2. Additionally, as shown in FIG. 15, the input and the output are provided on the same side of the housing G.

The shifting elements that are used can be configured as power shifting clutches or power shifting brakes. Non-positive clutches or non-positive brakes, such as, for example, disk clutches, band brakes and/or cone clutches, can especially be used. Moreover, positive brakes and/or positive clutches, such as, for example, synchronizing mechanisms or claw clutches, can also be used as shifting elements.

Figure 13:
FIG. 13 is a diagrammatic view of an embodiment of the inventive multi-speed transmission with an electric machine.
Figure 14:
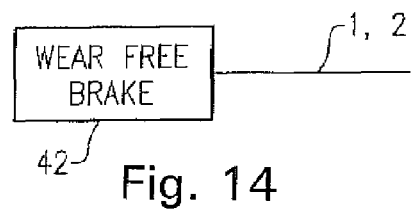
FIG. 14 is a diagrammatic view of a preferred design of the inventive multi-speed transmission having a wear free brake.

Another advantage of the multi-speed transmission presented herein in FIG. 13, is that an electric machine 40 can be mounted as a generator and/or as an additional drive engine on each shaft.

Any embodiment configuration, in particular any spatial arrangement of the planetary gearsets and the shifting elements per se, as well as with respect to each other, is understood to be covered under the protective scope of the claims, as long as it is practical from a technical point of view and does not influence the function of the transmission as disclosed in the claims, even if these embodiments are not explicitly depicted in the Figures or described in the disclosure.

REFERENCE NUMERALS 0 shaft
1 shaft
2 shaft
3 shaft
4 shaft
5 shaft
6 shaft
03 brake
04 brake
13 clutch
14 clutch
34 clutch
35 clutch
36 clutch
56 clutch
P1 planetary gearset
P2 planetary gearset
P3 planetary gearset
An input
Ab output
i gear ratio
phi progression ratio
G housing

The invention claimed is:

1. A multi-speed automatic transmission of a planetary design for a motor vehicle, the transmission comprising:
an input shaft (1) and an output shaft (2) arranged in a housing (G);
first, second and third planetary gearsets (P1, P2, P3), and each of the first, the second and the third planetary gearsets (P1, P2, P3) comprising a sun gear, a carrier and a ring gear;
at least third, fourth, fifth and sixth rotatable shafts (3, 4, 5, 6) as well as at least six shifting elements (03, 04, 13, 14, 34, 35, 36, 56), comprising first and second brakes (03, 04) and first, second, third and fourth clutches (13, 14, 34, 35, 36, 56), whose selective engagement creates different gear ratios between the input shaft (1) and the output shaft (2) so that at least seven forward gears and one reverse gear can be implemented;
wherein the input shaft (1) is permanently connected to the sun gear of the second planetary gearset (P2), and the input shaft (1) is detachably connected, via the first clutch (13), to the third shaft (3) and, via the second clutch (14), to the fourth shaft (4);
the output shaft (2) is permanently connected to the carrier of the second planetary gearset (P2) and to the ring gear of the third planetary gearset (P3);
the third shaft (3) is permanently connected to the carrier of the first planetary gearset (P1), and the third shaft (3) is detachably connected, via the first brake (03), to the housing (G) and, via the third clutch (36), to the sixth shaft (6);
the fourth shaft (4) is permanently connected to the sun gear of the first planetary gearset (P1), and the fourth shaft (4) is detachably connected, via the second brake (04), to the housing (G);
the fifth shaft (5) is permanently connected to the ring gear of the first planetary gearset (P1) and to the carrier of the third planetary gearset (P3);
the sixth shaft (6) is permanently connected to the ring gear of the second planetary gearset (P2);
the sun gear of the third planetary gearset (P3) is connected to the housing (G); and
one of:
the fifth shaft (5) is detachably connected, via the fourth clutch (56), to the sixth shaft (6),
the fifth shaft (5) is detachably connected, via the fourth clutch (35), to the third shaft (3), and
the third shaft (3) is detachably connected, via the fourth clutch (34), to the fourth shaft (4).

2. The multi-speed transmission according to claim 1, wherein the first planetary gearset (P1), the second planetary gearset (P2) and the third planetary gearset (P3) are arranged in an axial direction in the following sequential order:
the first planetary gear set (P1), the second planetary gear set (P2) and the third planetary gear set (P3).

3. The multi-speed transmission according to claim 1, wherein the first planetary gearset (P1), the second planetary gearset (P2) and the third planetary gearset (P3) are negative planetary gear sets.

4. The multi-speed transmission according to claim 1, wherein from an axial point of view, the first clutch (13) is adjacent the second clutch (14) and in the following sequential order of the first clutch (13) and the second clutch (14).

5. The multi-speed transmission according to claim 1, wherein the first clutch (13) and the second clutch (14) are disk clutches and have a common outer disk carrier.

6. The multi-speed transmission according to claim 1, wherein seven forward gears can be realized by one of the following:
if the fifth shaft (5) is detachably connected, via the fourth clutch (56), to the sixth shaft (6), then a first gear results from engagement of the first brake (03) and the third clutch (36), a second gear results from engagement of the second brake (04) and the third clutch (36), a third gear results from engagement of the third clutch (36) and the fourth clutch (56), a fourth gear results from engagement of the second clutch (14) and the and the third clutch (36), a fifth gear results from engagement of the first clutch (13) and the third clutch (36), a sixth gear results from engagement of the first clutch (13) and the second clutch (14), and a seventh gear results from engagement of the second brake (04) and the first clutch (13);

if the fifth shaft (5) is detachably connected, via the fourth clutch (35), to the third shaft (3), then the first gear results from engagement of the first brake (03) and the third clutch (36), the second gear results from engagement of the second brake (04) and the third clutch (36), the third gear results from engagement of the third clutch (36) and the fourth clutch (35), the fourth gear results from engagement of the second clutch (14) and the and the third clutch (36), the fifth gear results from engagement of the first clutch (13) and the third clutch (36), the sixth gear results from engagement of the first clutch (13) and the second clutch (14), and the seventh gear results from engagement of the second brake (04) and the first clutch (13); and if the third shaft (3)is detachably connected, via the fourth clutch (34), to the fourth shaft (4), then the first gear results from engagement of the first brake (03) and the third clutch (36), the second gear results from engagement of the second brake (04) and the third clutch (36), the third gear results from engagement of the third clutch (36) and the fourth clutch (34), the fourth gear results from engagement of the second clutch (14) and the and the third clutch (36), the fifth gear results from engagement of the first clutch (13) and the third clutch (36), the sixth gear results from engagement of the first clutch (13) and the second clutch (14), and the seventh gear results from engagement of the second brake (04) and the first clutch (13).

7. The multi-speed transmission according to claim 1, wherein the reverse gear results from engagement of the first brake (03) and the second clutch (14).

8. The multi-speed transmission according to claim 1, wherein at least one one-way clutch is located within the transmission.

9. The multi-speed transmission according to claim 8, wherein the at least one one-way clutch is located between the input shaft (1), the output shaft (2), the third shaft (3), the fourth shaft (4), the fifth shaft (5), and the sixth shaft (6) and the housing (G).

10. The multi-speed transmission according to claim 1, wherein an input and an output of the transmission are located on a common side of the housing (G).

11. The multi-speed transmission according to claim 1, wherein at least one of an axle differential and a transfer case differential is located on one of the input shaft (1) and the output shaft (2).

12. The multi-speed transmission according to claim 1, wherein a coupling element facilitates separation of the input shaft (1) from a drive motor.

13. The multi-speed transmission according to claim 12, wherein the coupling element is one of a hydrodynamic converter, a hydraulic clutch, a dry starting clutch, a wet starting clutch, a magnetic powder clutch and a centrifugal clutch.

14. The multi-speed transmission according to claim 1, wherein an external driving element is located downstream of the transmission, in a direction of power flow, and the input shaft (1) is firmly connected to a crankshaft of a drive motor.

15. The multi-speed transmission according to claim 1, wherein the vehicle is started via one of the at least six shifting elements (03) of the transmission, and the input shaft (1) is permanently connected to a crankshaft of a drive motor.

16. The multi-speed transmission according to claim 1, wherein a torsional vibration damper is located between a drive motor and the transmission.

17. The multi-speed transmission according to claim 1, wherein a wear-tree brake is arranged on at least one of the input shaft (1), the output shaft (2), the third shaft (3), the fourth shaft (4), the fifth shaft (5), and the sixth shaft (6).

18. The multi-speed transmission according to claim 1, wherein a power take-off is arranged on at least one of the input shaft (1), the output shaft (2), the third shaft (3), the fourth shaft (4), the fifth shaft (5), and the sixth shaft (6) for driving an additional unit.

19. The multi-speed transmission according to claim 18, wherein the additional unit is arranged on one of the input shaft (1) and the output shaft (2).

20. The multi-speed transmission according to claim 1, wherein the at least six shifting elements are one of power-shift clutches and power-shift brakes.

21. The multi-speed transmission according to claim 20, wherein the at least six shifting elements are one of multi-disk clutches, band brakes and cone clutches.

22. The multi-speed transmission according to claim 1, wherein the at least six shifting elements are one of positive clutches and positive brakes.

23. The multi-speed transmission according to claim 1, wherein an electric machine is arranged at least one of the input shaft (1), the output shaft (2), the third shaft (3), the fourth shaft (4), the fifth shaft (5), and the sixth shaft (6) as one of a generator and an additional drive unit.

* * * * *